United States Patent [19]

Bescherer

[11] 4,261,294
[45] Apr. 14, 1981

[54] BIRD FEEDER

[76] Inventor: Robert E. Bescherer, Church Cove Rd., Bristol, R.I. 02809

[21] Appl. No.: 79,381

[22] Filed: Sep. 27, 1979

[51] Int. Cl.³ .............................................. A01K 39/00
[52] U.S. Cl. .................................... 119/51 R; 119/61
[58] Field of Search ...................... 119/51 R, 51.5, 61, 119/23

[56] References Cited

U.S. PATENT DOCUMENTS

| 948,014 | 2/1910 | Lewis | 119/61 |
|---|---|---|---|
| 1,158,968 | 11/1915 | Benedict | 119/23 |
| 2,017,265 | 10/1935 | Tracy | 119/51 R X |
| 2,606,522 | 8/1952 | Harris | 119/51 R X |
| 2,709,986 | 6/1955 | Soltan | 119/51 R |
| 2,718,211 | 9/1955 | Pettas | 119/51 R |
| 2,865,326 | 12/1958 | Lowe, Jr. | 119/51 R X |
| 3,253,576 | 5/1966 | Tvedten | 119/51 R |
| 3,282,251 | 11/1966 | Dahmus | 119/23 |
| 3,913,527 | 10/1975 | Kilham | 119/51 R |

Primary Examiner—Gene Mancene
Assistant Examiner—Robert P. Swiatek
Attorney, Agent, or Firm—Barlow & Barlow

[57] ABSTRACT

A bird feeder which is removably mounted on a window pane, having a bracket member with a shelf on which a removable feed tray nests. The feed tray for solid bird feed is an open-topped pan with a lip on which birds may perch and has a well section extending downward from the main bottom of the tray which fits into a hole on the shelf. The feed tray for liquid bird food is provided with a vividly colored cover which fits snugly into a lip. The cover provides several conical shaped feeding ports for access to the liquid bird food. Models of the bird feeder may be made with different length shelves to accommodate the number of feed trays desired.

11 Claims, 7 Drawing Figures

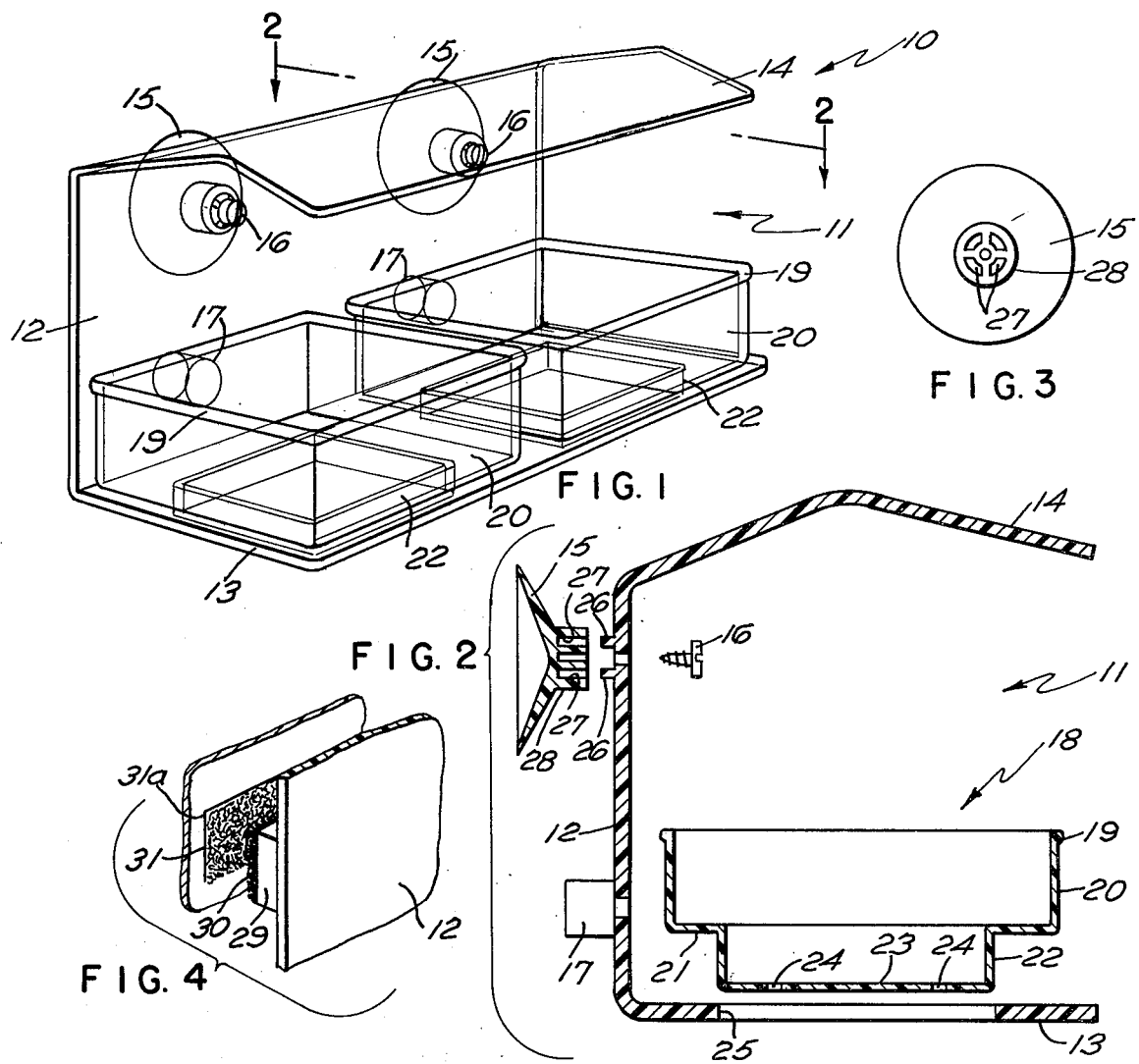
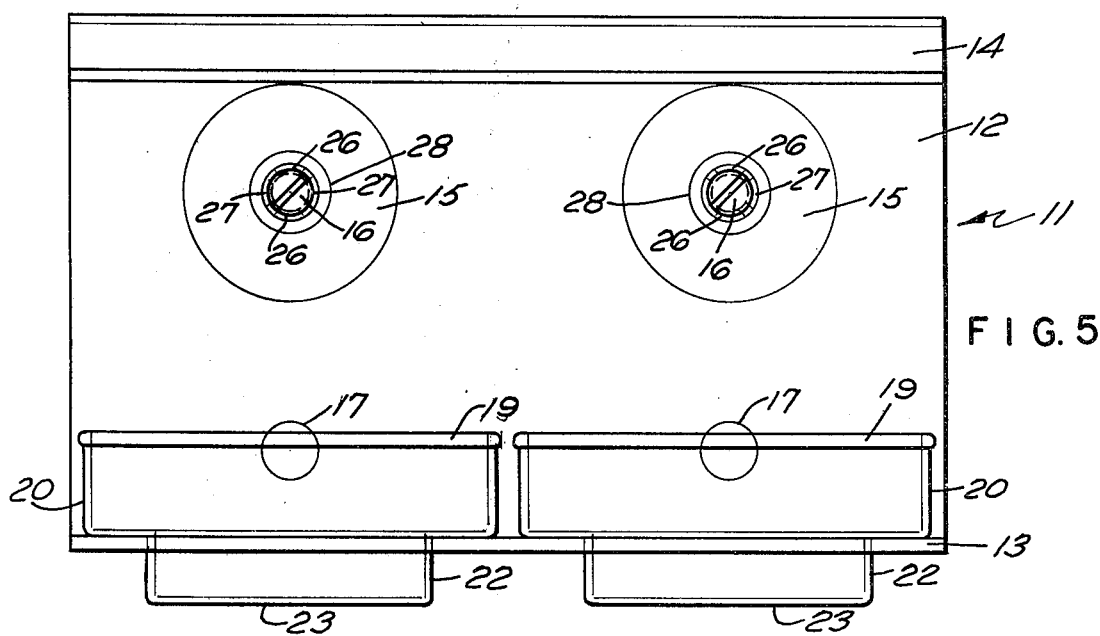

BIRD FEEDER

BACKGROUND OF THE INVENTION

This invention relates to an improved bird feeder. More particularly, this invention relates to a bird feeder which mounts on the outside surface of a window pane and has one or more removable feed trays.

Window bird feeders which are adapted to be mounted with a suction cup to a window pane have been known. The feeder of the prior art is a single feed tray which is an integral part of the whole unit that makes it difficult to fill with bird feed and to clean. In order to wash and clean the bird feeder, it is necessary to reach out of the open window and possibly even remove it in order to wash it. Other forms of bird feeders are known in the prior art as, for example, in Kofsky U.S. Pat. No. 3,076,433 and Lowe U.S. Pat. No. 2,865,326. Animal feeders where feeding bowls are removable are also shown in Copeland U.S. Pat. No. 2,845,896 but with this structure the bowls are difficult to remove and do not adapt themselves for use as a bird feeder. In a similar vein is the Boyer patent U.S. Pat. No. 4,011,951 where feed buckets are supported by their rims. Hummingbird feeders which form a part of the instant disclosure are also known in the prior art as, for example, in the Kilham patent U.S. Pat. No. 3,913,527 and as a clear plastic tube with a red colored lid and perch.

SUMMARY OF THE INVENTION

This invention is a combination of elements which provide many advantages over prior art.

When a bird feeder is mounted on the outside surface of a window pane, it is difficult to fill a feed tray or to clean it by reaching through a partially opened window. This problem is simplified by making the feed tray so that it may be removed from the body of the feeder for filling or washing. However, a removable tray setting on a flat shelf would easily be dislodged by birds or animals. To be practical, any restraining means must permit the removal of the feeding tray with one hand. One of the features of this invention is a removable feed tray which is not easily dislodged and yet is easily reached through a partially opened window for removal or placement on a shelf of the bird feeder. Another problem with a removable feed tray is the possibility of the feed tray being tipped by the weight of a bird perched on it. Therefore the feed tray must be so designed that it will remain stable while a bird is perched on it for feeding from it.

It is desirable that models are easily constructed which provide shelf room for several trays so that more than one bird may feed from the feeder at the same time or so that more than one variety of feed may be offered to the birds.

It is also desirable that models of feed trays be made which will accept different types of bird feed; as, for example, solid feed such as bird seed or suet or liquid feed such as nectar. One of the problems of attracting nectar consuming birds, such as hummingbirds, to a window is the danger of the birds injuring or killing themselves by flying into the window pane. Therefore, a bird feeder for nectar must provide a safe means for attracting birds in the vicinity of a window.

It is an object of this invention to provide a bird feeder which attaches to the outside surface of a window pane to provide a person a closeup view of birds feeding from it.

It is a further object of this invention to provide a bird feeder of the type which attaches to the outside surface of a window pane which has a removable feed tray for convenience in washing and filling the tray with feed for the birds.

It is still a further object of this invention to provide a bird feeder of the type which attaches to the outside surface of a window pane in which a removable feed tray provides a stable perch for a bird feeding from the tray.

It is another object of this invention to provide a bird feeder of the type which attaches to the outside surface of a window pane in which a removable feed tray is provided with means for preventing birds or animals from dislodging the tray from the body member of the feeder.

It is yet another object of this invention to provide a bird feeder of the type which attaches to the outside surface of a window pane and which has a removable feed tray that is easily removed or set on a shelf with one hand by reaching through the partially opened window.

It is still another object of this invention to provide a bird feeder of the type which attaches to the outside surface of a window pane which has available a removable feed tray for holding nectar and which will safely attract hummingbirds.

It is another object of this invention to provide a bird feeder of the type which attaches to the outside surface of a window pane which accommodates a plurality of removable feed trays.

The above objects are accomplished by the construction of the bird feeder in which the body member of the bird feeder is made in the shape of a channel which provides a back panel for attaching the body member to a support means, a shelf for supporting one or more feed trays and a roof for protecting the feed in the feed tray from precipitation. Each of the feed trays has a well or skirt formed on its bottom which mates with a hole in the shelf to provide means for preventing birds and animals from dislodging the feed tray from the shelf. With this type of nesting, the body of the feed tray is above the surface of the shelf so that it may be gripped and removed or placed on the shelf with one hand extended through the partially opened window.

In those models of feed trays designed to hold solid feed, the upper lip of the side wall of the feed tray serve as a perch. So that the perch will be stable, the bottom of the feed tray is proportioned so that it provides a stable support for the lip when birds perch on the lip.

The support means for supporting the body member may be a suction cup, a burr-like fabric or the like, which is easily removed from the surface of the window pane for cleaning the window or storing the bird feeder. In order to prevent the back panel of the bird feeder from blocking the flow of precipitation from its roof, spacing bosses are provided on the back panel.

With the channel shape of construction, different models of the bird feeder may be provided by lengthening the body member so that it will accommodate the number of desired feed trays on its shelf.

The feed tray for offering bird seed or other solid feed to the birds has a well extending downwardly from its bottom. Drain holes in the bottom of the well prevent the feed tray from filling with precipitation.

Feed trays for offering nectar to nectar consuming birds, such as hummingbirds, may omit the drain holes or replace the well section with a skirt which mates with the hole in the shelf. In addition, the nectar type of feed tray includes a cover which fits snugly into the lip of the tray. In the book "Songbirds in Your Garden", third edition, by John K. Terres, published by Hawthorn Books, Inc., New York, the author devotes a chapter starting on page 111 to "Humming Birds and How to Attract Them". On page 125, he warns of the dangers of hummingbirds crashing against a window while in full flight because of seeing flowers on the other side. He also points out what attracts hummingbirds. In order to make the nectar type of feed tray safe to use at a window, the entire cover is made of a vivid color, such as bright red. One or more feeding ports are provided in the cover which permit the bird to reach and consume the nectar in the feed tray. With the bird feeder attached to the surface of a window pane, hummingbirds attracted to it are unlikely to see an image of themselves mirrored in the pane. If their attention should be diverted by an image or flowers on the other side of the window pane, they are so close to the pane that they are unlikely to dart into the pane with sufficient speed to injure themselves.

This bird feeder with the bright red covered feed tray has been tested at the Ramsey Canyon Nature Research Center in Arizona with excellent results in safely attracting hummingbirds reported by trained observers.

DESCRIPTION OF THE DRAWINGS

An understanding of the general nature of this invention and an appreciation of its many advantages will best be gained from a study of the following description given in connection with the drawings in which:

FIG. 1 is a perspective view of a model of the bird feeder designed to provide double removable feed trays;

FIG. 2 is a cross sectional exploded view of the bird feeder of FIG. 1 taken on line 2—2;

FIG. 3 is a rear view of a suction cup;

FIG. 4 is a cut-away section showing an alternative means of supporting the body section;

FIG. 5 is a front view of a model of the bird feeder designed to accommodate two feed trays;

DESCRIPTION OF THE PREFERRED EMBODIMENTS

Figure 6:
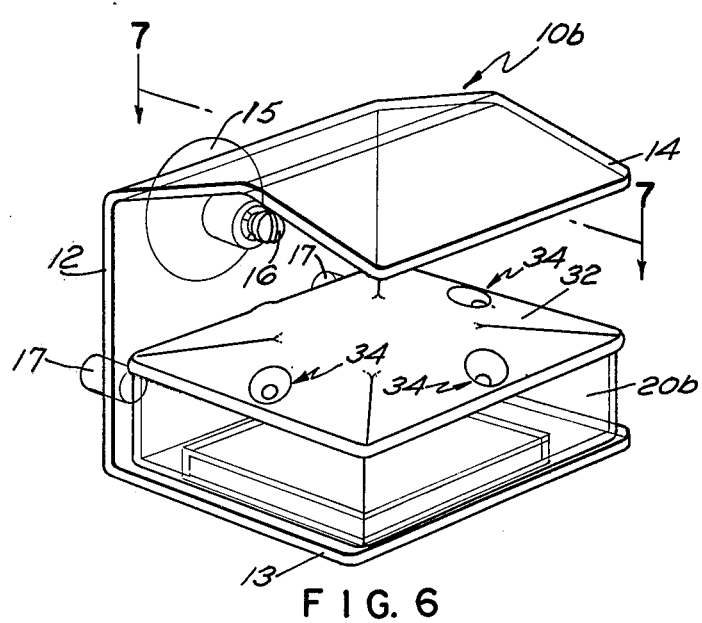
FIG. 6 is a perspective view of a model of the bird feeder designed to attract hummingbirds.

Referring to FIGS. 1, 2 and 3, bird feeder 10 includes a body member 11 which is basically in the form of a channel having a back panel 12 with shelf section 13 extending outwardly at its bottom edge and roof section 14 extending outwardly in the same direction from its upper edge. Roof section 14 extends a short distance beyond shelf section 13 to provide protection to shelf section 13 from precipitation. A support means in the form of plastic suction cup 15 is attached to body member 11 by screw 16. Two laterally spaced bosses 17 on back panel 12 near the bottom edge thereof provide means for supporting body member 11 a distance from the surface of the window pane on which bird feeder 10 may be attached. The spacing of panel 12 from the surface of the window pane (not shown) allows precipitation to drain from the roof section 14 without obstruction.

Feed tray 18 is basically an open topped pan with lip 19 at the top edge of side walls 20. Lip 19 serves as a perch for birds feeding from feed tray 18. In order that feed tray 18 will be stable as birds perch on lip 19, main bottom 21 extends outwardly to provide a support for side walls 20 and lip 19. Extending downwardly from main bottom 21 is well section 22 with well bottom 23. Holes 24 are provided in well bottom 23 for draining any precipitation that might collect in well section 22.

Well section 22 of feed tray 18 nests in hole 25 of shelf section 13 and provides means for preventing birds or animals from dislodging feed tray 18 from shelf section 13. The cross section of hole 25 and well section 22 may have any configuration. The combination of a square cross section of feed tray 18, well section 22 and hole 25 provides the maximum capacity for bird feed and the simplest manipulation in removing or replacing feed tray 18 from shelf section 13.

As described above, the bird feeder 10 is supported by a single plastic suction cup 15. If screw 16 is not sufficiently tight, or becomes loose, a bird perching on lip 19 may cause body member 11 to pivot or become unstable. In order to prevent this from occurring, lugs 26 are provided on back panel 12 located so as to engage with recesses 27 in the hub of plastic suction cup 15.

Referring now to FIG. 4, an alternate support is disclosed in which a boss 29 on the back of panel section 12 has cemented thereto a burr type fabric 30. A mating burr type fabric 31 is provided with a pressure type of adhesive on side 31a for attaching the fabric 31 to the surface of the window pane (not shown).

It will be apparent that the channel form of body member 11 may be extended longitudinally to provide space for nesting additional feed trays 18 or alternately may be shortened to provide for nesting of a single feed tray 18. It is obvious that this concept may be extended to include space for nesting three or more feed trays 18. Due to the length of body member 11, two plastic suction cups 15 are provided for supporting body member 11 on the surface of the window pane (not shown), it being preferable to utilize a suction cup or fastener. Feed trays 18 may be modified so that they will serve various purposes. On a model having room for more than one feed tray 18, one of the feed trays may have drain holes and be used for bird seed, while another of the feed trays may have no drain holes so that it may be filled with water for the birds to drink or bathe in.

Figure 7:
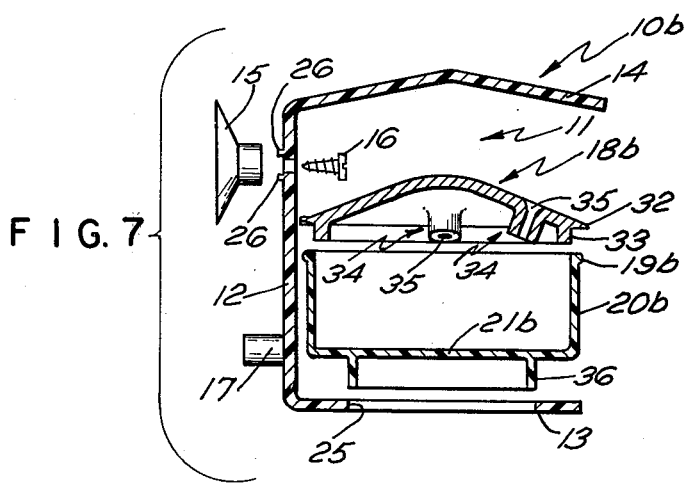
FIG. 7 is a cross sectional exploded view of the bird feeder of FIG. 6 taken on line 7—7.

Referring to FIGS. 6 and 7, bird feeder 10b is designed to attract hummingbirds. In bird feeder 10b, the body member 11 and suction cup 15 are the same as described in relation to FIGS. 1 and 2 hereinabove with nectar style feed tray 18b substituted for feed tray 18 which is for solid type bird feed. Feed tray 18b is basically an open topped pan with lip 19b at the top edge of side walls 20b and bottom 21b extending across the entire area of feed tray 18b. A skirt 36 extends downwardly from the bottom 21b with a size and shape to mate with hole 25 in shelf section 13. Cover 32 has a rim 33 which fits snugly into lip 19b with the wall of cover 32 extending over lip 19b. Cover 32 is made convex so it will shed precipitation. One or more feeding ports 34 are provided in cover 32 to accommodate the beak of a hummingbird. Feeding ports 34 are conical in shape, terminating in a hole 35 which is small enough to exclude bees, wasps, yellow jackets and the like. The entire exposed surface of cover 32 is colored a vivid red or any other vivid color which will attract hummingbirds. The body member 11 should be made of a contrasting color from the vivid color of cover 32, preferably of a clear plastic. By presenting a relatively large vividly colored surface, hummingbirds are attracted to feeder 10b and this reduces the risk of a bird flying against the window pane.

I claim:

1. A bird feeder adapted to be attached to the surface of a window pane, comprising, in combination:
   support means adapted to be attached to the surface of said window pane,
   a body member having a shelf section,
   attachment means for attaching said body member to said support means with said shelf section extending outwardly from the surface of said window pane, and
   a feed tray having a bottom adapted to support said feed tray on said shelf section, said feed tray having peripheral side walls and a well section located inwardly of said side walls and extending downwardly from said bottom, said shelf section including a hole, said well section only being of a size and shape to fit into and extend thru said hole with the bottom portion of the tray extending outwardly from said well section resting on the shelf section whereby said feed tray is prevented from being dislodged from said shelf section by birds and animals and supports said sidewalls.

2. The bird feeder as claimed in claim 1 wherein said feed tray is in the form of an open-topped pan having its side walls extending upwardly from said bottom
   whereby the upwardly extending side walls remain above said shelf section where they may be grasped for setting said feed tray on said shelf section or removing it therefrom.

3. The bird feeder as claimed in claim 2 wherein said feed tray includes
   a lip at the termination of said side walls and
   said bottom is proportioned to provide a stable support for said lip when birds perch thereon.

4. The bird feeder as claimed in claim 2 wherein said well section is in the form of an open-topped well section having a well bottom.

5. The bird feeder as claimed in claim 4 wherein said well bottom includes drain holes.

6. The bird feeder as claimed in claim 1 wherein said hole in said shelf section, said well section and said feed tray are square in cross section.

7. The bird feeder as claimed in claim 1 wherein said support means is
   a first piece of burr type fabric coated on one side with a pressure type adhesive adapted to adhere to the surface of said window pane and
   said attachment means includes a second piece of burr type fabric attached to said body member,
   said second piece of burr type fabric being adapted to cling to said first piece of burr type fabric.

8. The bird feeder as claimed in claim 1 wherein said body member includes
   spacing bosses extending in the opposite direction from said shelf section and spaced from said support means,
   whereby said spacing bosses and said support means maintain said body member in a stable position against said window pane and spaced therefrom to permit precipitation to flow freely therebetween.

9. The bird feeder as claimed in claim 1 wherein said feed tray includes
   a removable cover having at least one feeding port.

10. The bird feeder as claimed in claim 9 wherein said cover is made a vivid color to attract nectar consuming birds.

11. A bird feeder as in claim 1 including a suction cup for attaching said body member to a window pane, said suction cup including a recess on the opposite side thereof and outwardly of the cup and said body member having a lug extending in the opposite direction from said shelf section whereby said lug is of a size to engage said recess to maintain said body member in a fixed attitude when said body member is attached to said suction cup.

* * * * *